Jan. 28, 1958  J. F. McCARTHY  2,821,050
EDGE GRINDING MACHINE FOR LENSES
Filed Sept. 29, 1954  9 Sheets-Sheet 1

INVENTOR.
JAMES F. McCARTHY
BY
ATTORNEY

Jan. 28, 1958  J. F. McCARTHY  2,821,050
EDGE GRINDING MACHINE FOR LENSES
Filed Sept. 29, 1954  9 Sheets-Sheet 4
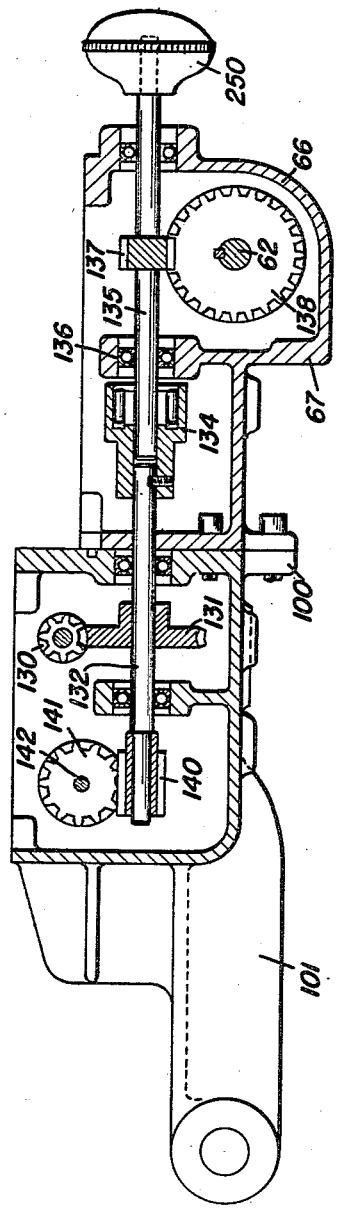
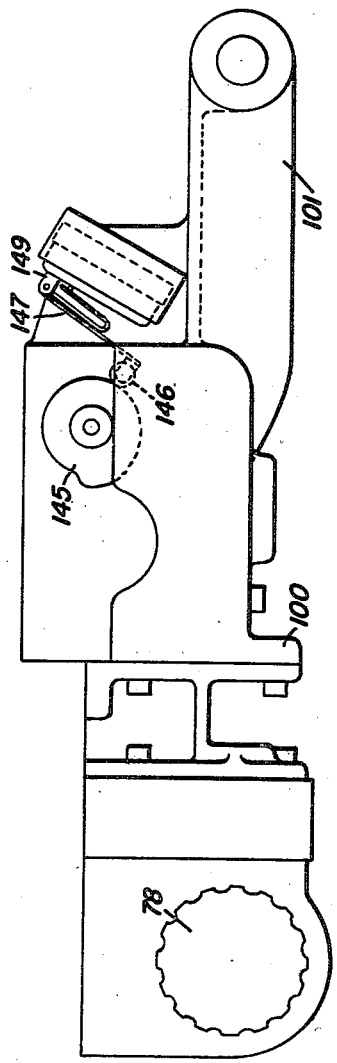
INVENTOR.
JAMES F. McCARTHY
BY
ATTORNEY INVENTOR.
JAMES F. McCARTHY Jan. 28, 1958 J. F. McCARTHY 2,821,050
EDGE GRINDING MACHINE FOR LENSES
Filed Sept. 29, 1954 9 Sheets-Sheet 8

INVENTOR.
JAMES F. McCARTHY
BY
ATTORNEY

Jan. 28, 1958     J. F. McCARTHY     2,821,050
EDGE GRINDING MACHINE FOR LENSES

Filed Sept. 29, 1954     9 Sheets-Sheet 9

INVENTOR.
JAMES F. McCARTHY
BY
ATTORNEY

United States Patent Office 2,821,050
Patented Jan. 28, 1958

2,821,050

EDGE GRINDING MACHINE FOR LENSES

James F. McCarthy, Oak Corners, N. Y., assignor to Shuron Optical Company, Inc., Geneva, N. Y., a corporation of New York Application September 29, 1954, Serial No. 459,102

6 Claims. (Cl. 51—101)

The present invention relates to edge grinding machines and more particularly to machines for grinding beveled and/or flat, edges on ophthalmic lenses.

In grinding the edge of an ophthalmic lens it is customary to use a machine in which the contact of the lens with the wheel is controlled by a template made to the desired shape to be ground on the lens. The template is mounted coaxially with the work. The work is stationary during actual grinding. When the grinding wheel has ground the lens down, in the area of its engagement with the lens, to the desired size, the template trips a switch which closes a circuit to the drive motor for the work spindle. The work is thereupon rotated through a slight angle, far enough for a new area of the work to be brought into engagement with the wheel and to lift the template clear of the switch. The work drive motor thereupon is stopped, and remains stopped until after the wheel has ground the lens down in the new area which has indexed into grinding position. Then the template trips the work-motor start switch again.

So the process proceeds with alternate grinding and indexing of the work. The peripheral surface of the lens is ground therefore in a series of steps; and it is in effect a series of scallops produced by the wheel. The closer the scallops are to one another the more nearly the peripheral surface of the finished lens approaches a smooth surface.

With electric motors, such as used in conventional edge grinders for driving the work, it is impossible to stop the work instantaneously at the end of an indexing operation. There is some coasting of the motor, even though infinitesimal. With conventional edge grinders, therefore, it is necessary to ground around a lens several times in order to insure a satisfactory shape around the edge of the lens.

At the end of the grinding operation, the work is moved clear of the grinding wheel to permit removal of the completed workpiece and chucking a new lens blank. With conventional edge grinders, however, there is always the tendency for the wheel to leave a hump on the periphery of the work at the time the work is moved away from the wheel, because conventional machines are so constructed that the work motor stops before the work is moved clear of the wheel. A hump, like any defect in the peripheral surface of the lens, is objectionable because it makes it hard to fit the eyewire or spectacle frame closely about the lens.

One object of the present invention is to provide a machine which will grind the edges of ophthalmic lenses much more smoothly than has heretofore been possible.

Another object of the invention is to provide a machine of the type described which will be extremely fast in operation.

Another object of the invention is to provide an edge grinder with which the peripheral surface of a lens can be ground to acceptable shape in a single revolution of the work, and with which in a given number of revolutions of the work a more satisfactory finish can be obtained than is possible with conventional lens edge grinders.

To these ends it is a purpose of the present invention to provide an edge grinder in which the work can be stopped instantaneously at the end of each indexing operation. To these ends, also, it is a purpose of the invention to provide an edge grinder in which the work will continue to rotate, after the grinding operation is completed, until the work has been moved to loading position.

Another object of the invention is to provide an edge grinder which will be relatively simple in construction.

Other objects of the invention will be apparent hereinafter from the specification and from the recital of the appended claims.

In the drawings:

Fig. 4 is a fragmentary vertical section on the line 4—4 of Fig. 3 looking in the direction of the arrows;

Fig. 5 is a part side elevation, part section, looking from the right in Fig. 3;

Figure 1:
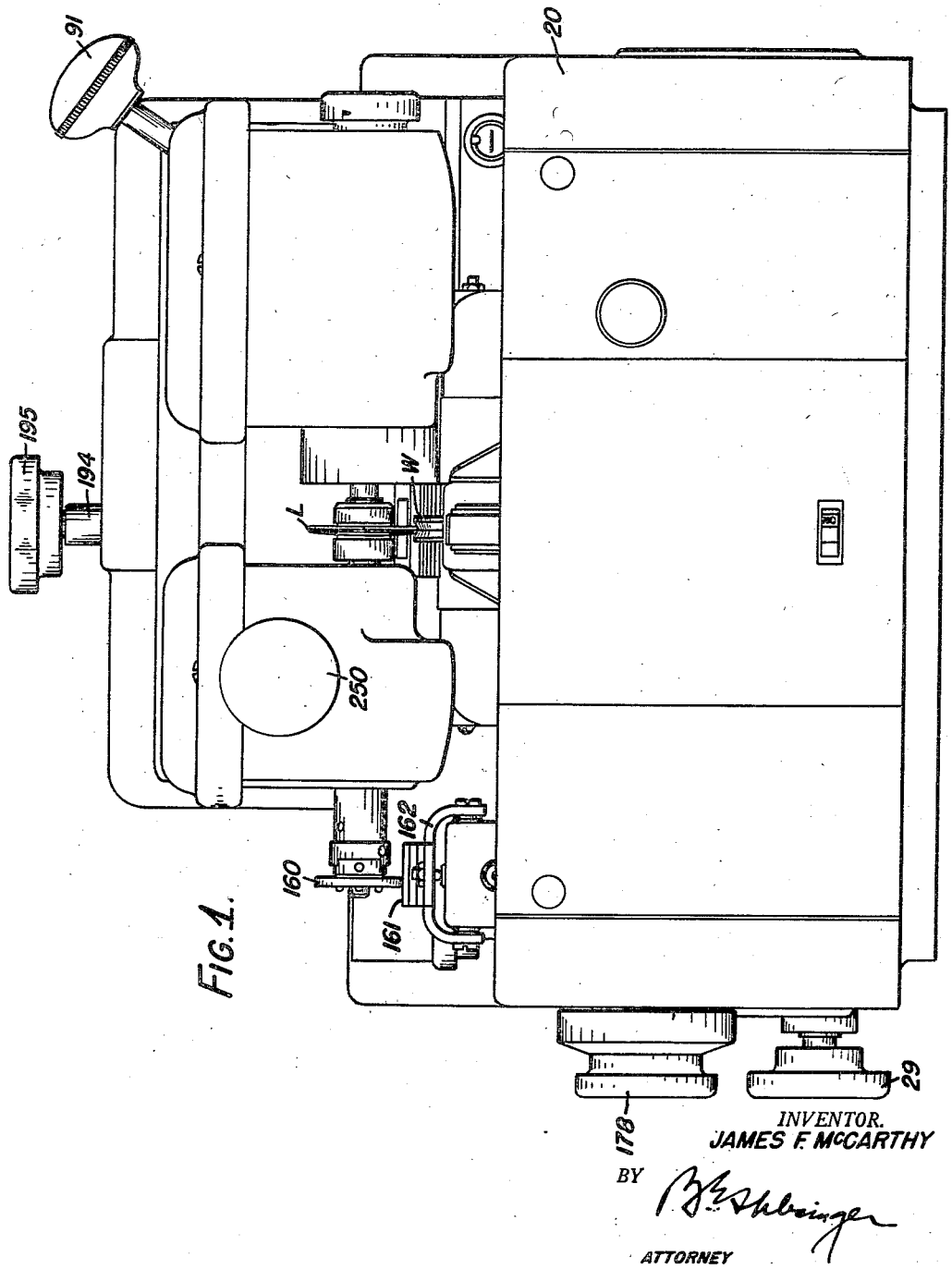
Fig. 1 is a front view of an edge grinder built according to one embodiment of this invention.

In the machine illustrated in the drawings, there is a template mounted coaxial with the work, which trips a switch to start the work drive motor and index the work, when the work has been ground down to the desired degree in a given area, as in conventional machines; but in the machine of the present invention the work is driven by a hydraulic motor which runs only when a control valve is open permitting flow of the hydraulic motive fluid to it. This valve is shifted by a solenoid to open the fluid supply line; and when the solenoid is deenergized the motive fluid supply line is closed instantaneously. When the work has been indexed far enough for a new area of the work to be brought into engagement with the wheel, the template disengages the trip switch, as in conventional machines, but the disengagement of the switch deenergizes the solenoid, and the hydraulic motor stops instantly without coasting. Therefore the scallops ground on the periphery of the work can be spaced closer together; and several revolutions of the work for clean up are rendered unnecessary.

In the machine illustrated, moreover, stoppage of the work is controlled by a cam which controls operation of a solenoid which operates a three-way valve, and prevents stoppage of the rotation of the work, after the last grinding operation, until the work has been moved to chucking position. Thereby any tendency for a hump to be left on the lens is obviated.

Figure 6:
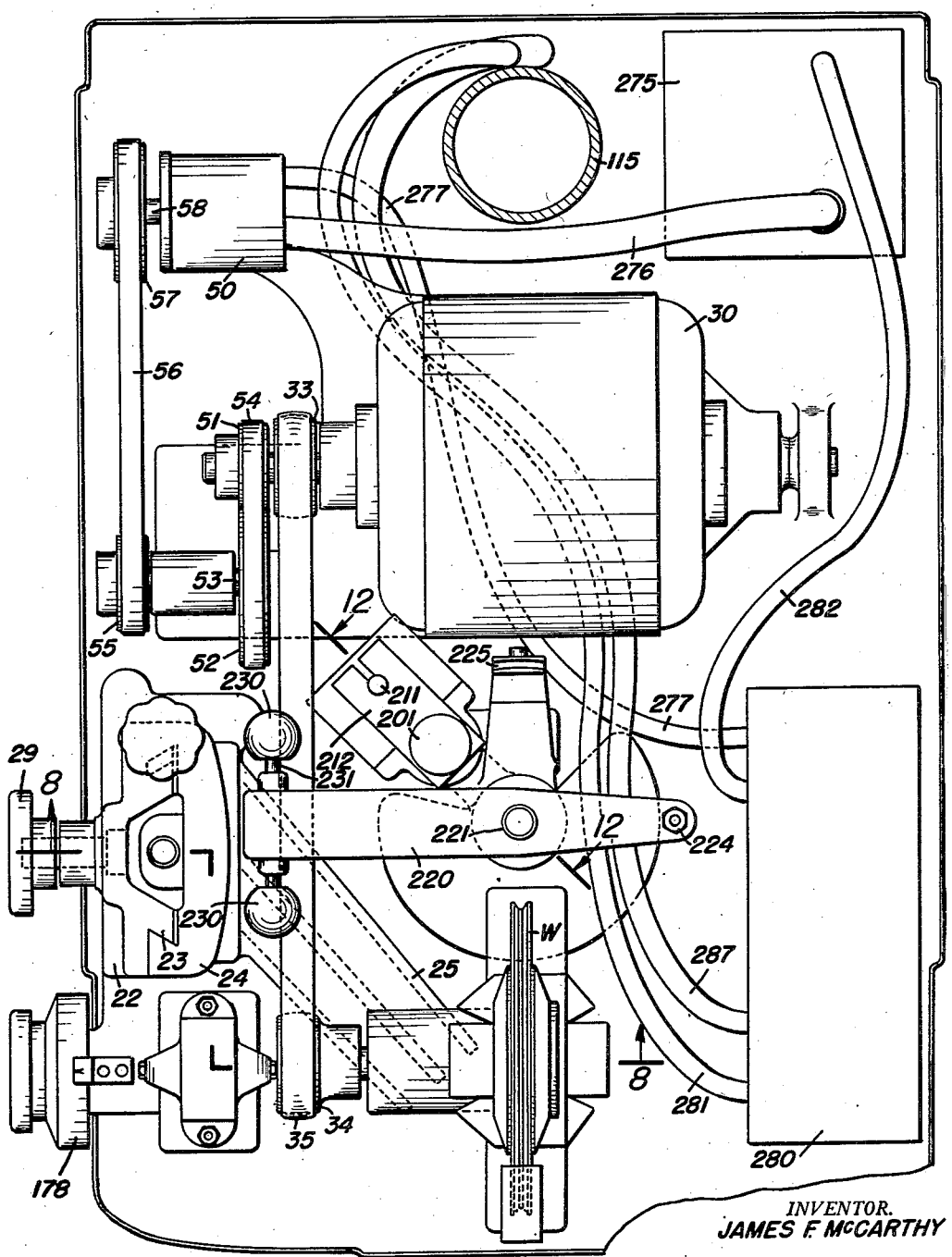
Fig. 6 is a fragmentary horizontal section on a somewhat enlarged scale taken in a plane below the plane of Fig. 3 and showing particularly the drives to the grinding wheel and to the pump, and the mounting for the dressing diamond.
Figure 8:
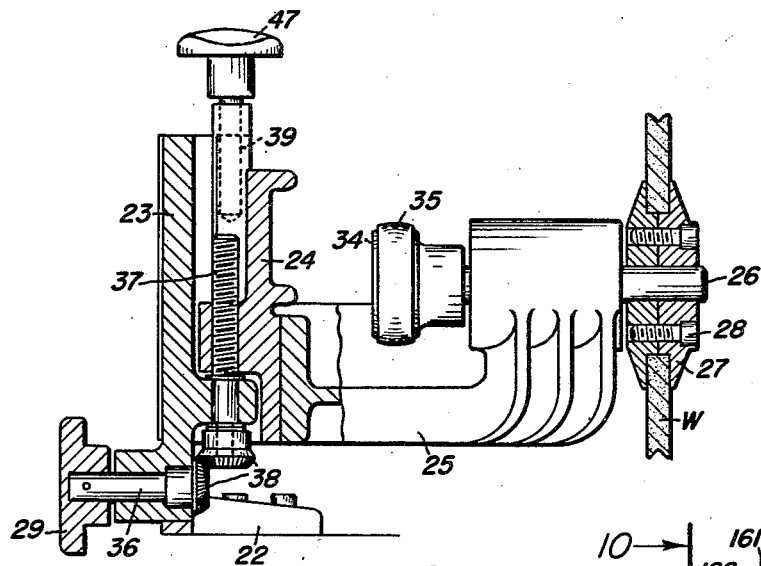
Fig. 8 is a section on the line 8—8 of Fig. 6, looking in the direction of the arrows.

Referring now to the drawings by numerals of reference, 20 denotes the base of the machine. Mounted at one side of the base 20 is a column 22 (Figs. 6 and 8). This column has dove tail ways 23. Mounted on these ways for vertical sliding adjustment is a slide 24, which has a ribbed arm 25 projecting laterally and forwardly therefrom. Journaled in the arm 25 is a shaft 26 to which is clamped by conventional clamping plates 27 and screws 28 a grinding wheel W.

The grinding wheel shown has a V-groove in its periphery for grinding a bevel edge on a lens.

Vertical adjustment of slide 24 and of grinding wheel W, to compensate for variation in diameter of the wheel with wear, is effected by rotating a handwheel 29 which is secured to a stub shaft 36 that is journaled in column 22. Shaft 36 drives a screw shaft 37 through a pair of bevel miter gears 38, one of which is secured to shaft 36 and the other of which is secured to shaft 37. Screw shaft 37 threads into slide 24. A conventional gib (not shown), that may be adjusted by a conventional screw 39, is provided to take up wear of the slide. Screw 39 is manipulated by knob 47.

The grinding wheel is adapted to be driven from an electric motor 30 (Figs. 6 and 7) which is mounted in conventional fashion upon a plate 31 that is pivoted at 32 on the base 20 of the machine. Secured to the armature shaft of the motor is a pulley 33 which drives a pulley 34, and the grinding wheel shaft 26, through a belt 35. Pulley 34 is secured to grinding wheel shaft 26. The belt 35 is maintained tight in conventional manner by a coil spring 40 which is mounted between washers 41 on a rod 42 that is pivoted by means of a pin 43 in the base of the machine. Upper washer 41 engages the furcations 44 of an extension of motor base 31. These furcations straddle the rod 42. The furcations 44 are held in engagement with the upper washer 41 by a washer 45 and nut 46. The latter threads on the rod 42.

Figure 3:
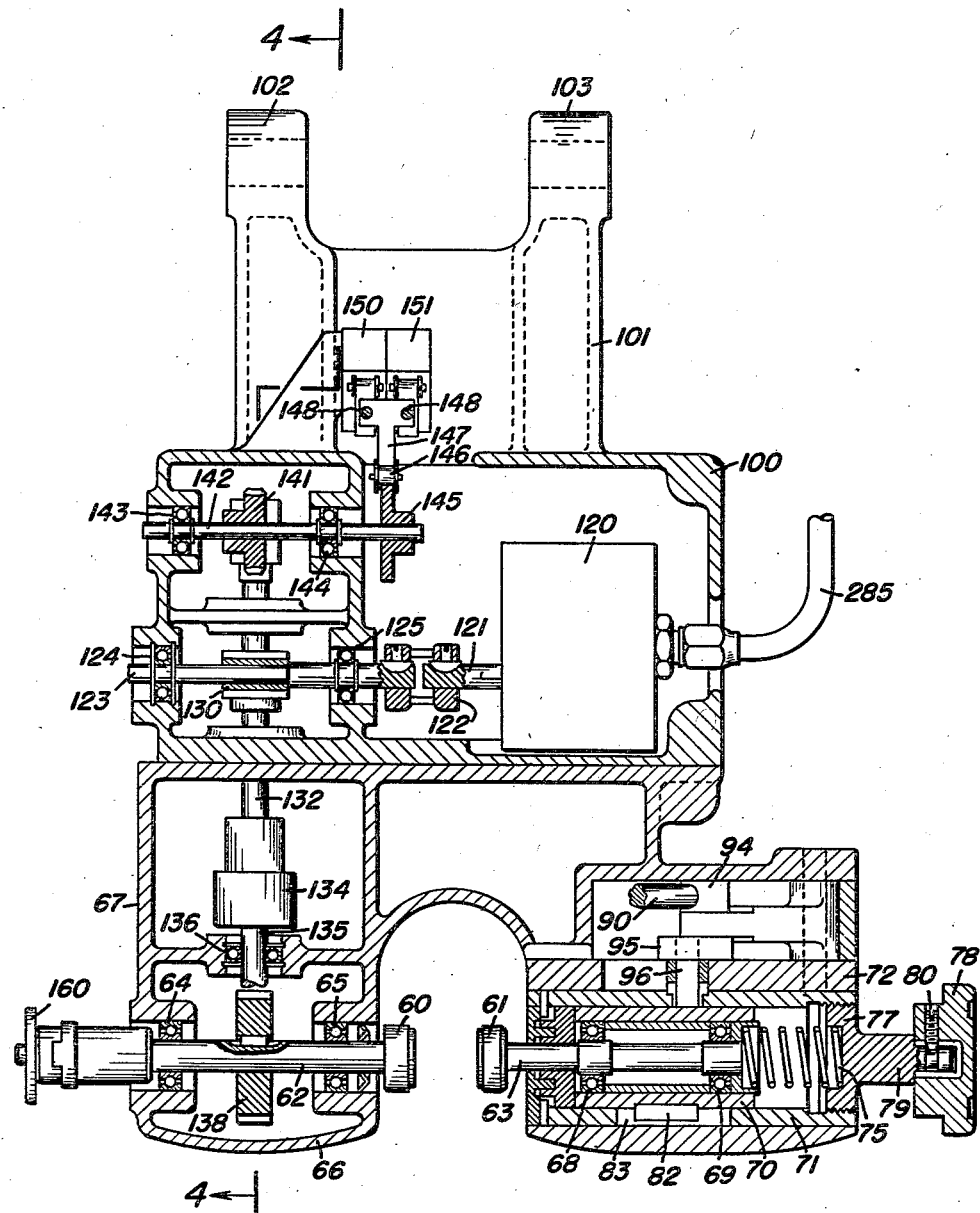
Fig. 3 is a horizontal section showing the work support and part of the drive mechanism of the machine.

The motor 30 also drives the hydraulic pump 50 (Fig. 3). The drive to the pump is through a pulley 51, also mounted on the armature shaft of the motor, a pulley 52, which is secured to a stub shaft 53 that is journaled in the plate 31, the belt 54, a pulley 55 also secured to stub shaft 53, a belt 56, and a pulley 57 which is secured to the drive shaft 58 of the pump.

The lens L, which is to be ground, is clamped between opposed coaxial clamping heads or collars 60 and 61 (Fig. 3) which are secured, respectively, upon coaxial rotary shafts 62 and 63. Shaft 63 is journaled on anti-friction bearings 68 and 69 on a slide 70 that is slidable axially of the spindle 63 in a sleeve 71. Sleeve 71 is mounted against rotation in the furcation 72 of the carriage 67.

The clamping head 61 is constantly pressed toward ens clamping position by a coil spring 75, which is interposed between the slide 70 and a nut 77 that threads into the sleeve 71. A knurled knob 78, which is secured to a projection 79 of the nut 77 by a pin 80, permits of adjustment of the tension of the spring 75. A key 82, which is secured to the slide 70 and which engages in an elongate slot 83 in the sleeve 71, serves to prevent rotation of the slide 70 in its reciprocating movement.

Figure 2:
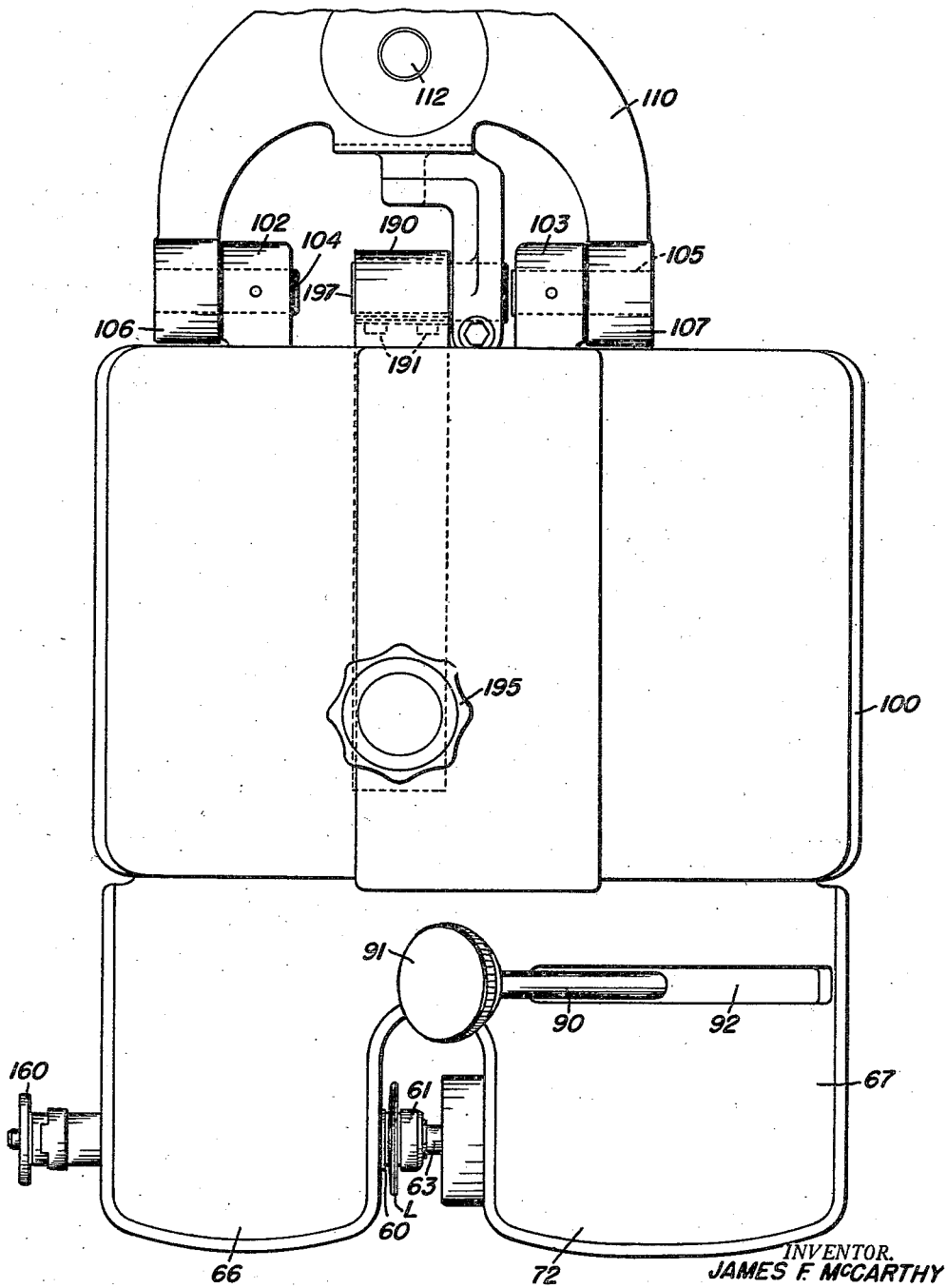
Fig. 2 is a fragmentary plan view of this machine.

The slide 70 is adapted to be moved to inoperative position, to permit removal of a lens from the machine and positioning of a new lens between the clamping heads 60 and 61, by a lever 90 which is manipulated by a knurled knob 91 (Fig. 2). Lever 90 is movable in an elongate slot 92 in the carriage 67. It is connected at its lower end to a shaft 94 which is journaled in the carriage 67 and which has an arm 95 that carries a pin 96 which engages in the slide 71. By rocking the lever 90 from the position shown in Fig. 2 to that shown in Fig. 1, the clamping head 61 can be moved against the resistance of the spring 75 to release a lens held between it and the clamping head 60.

The carriage 67 is secured to a support 100 (Fig. 3) that has a furcated portion 101 projecting rearwardly therefrom. The furcations 102 and 103 of the portion 101 are pinned to shafts 104 and 105, respectively (Fig. 2). These are journaled in the furcations 106 and 107 of a forked support 110 which is secured by a set-screw 111 (Fig. 7) to the upper end of a shaft 112 which is journaled on anti-friction bearings 113 and 114 in a sleeve 115 which is bolted by bolts 116 to the base 20 of the machine.

The work spindle 62 is driven from a hydraulic motor 120 (Fig. 3). The driven shaft 121 of this motor is connected by a conventional coupling 122 to an axially aligned shaft 123. This shaft is journaled on anti-friction bearings 124 and 125 in the support 100. It has a worm 130 keyed to it which meshes with a wormwheel 131 (Figs. 4 and 14) that is secured to a shaft 132. This shaft is journaled adjacent opposite ends in the support 100 and carriage 67, respectively, on anti-friction bearings. This shaft is connected at its forward end by a conventional overrunning clutch 134 with an axially aligned shaft 135 that is journaled on suitable anti-friction bearings in the carriage 67. One of these bearings is shown at 136. Shaft 135 has a worm 137 secured to it or integral with it, which meshes with a wormwheel 138 that is keyed to the work spindle 62.

Figure 14:
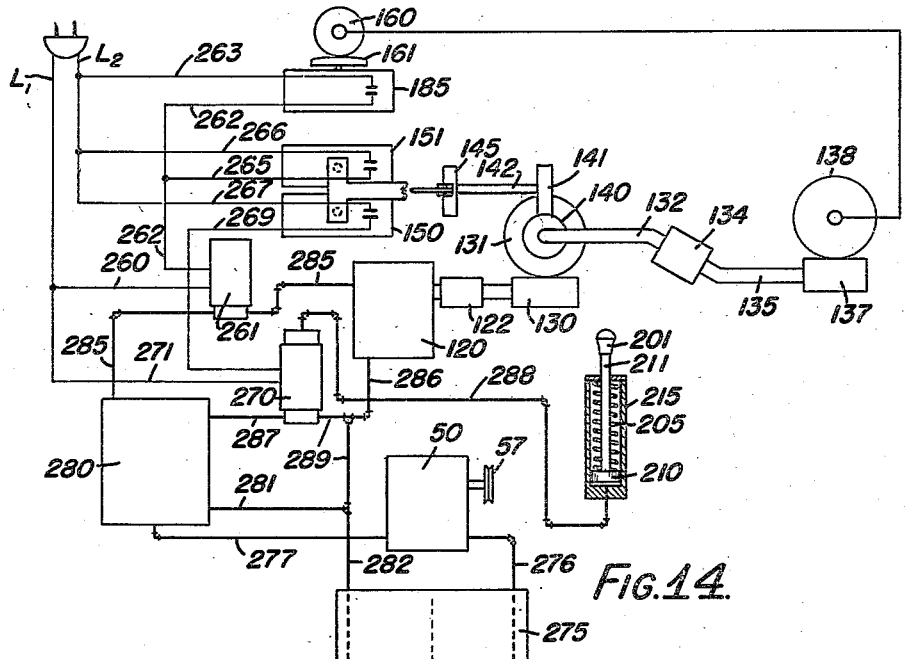
Fig. 14 is a diagrammatic view showing the hydraulic and electrical circuits of the machine when constructed for bevel edging.

The shaft 132 also has a worm 140 secured to it which meshes with a wormwheel 141 (Figs. 3, 4 and 14) which is secured to a shaft 142 that is journaled on anti-friction bearings 143 and 144 (Fig. 3) in the support 100. This shaft has a cam 145 secured to it. A roller 146 (Figs. 3 and 5), that is carried by a resilient spring member 147, engages this cam. This spring member is pivotally mounted on a bracket 149 (Fig. 5) and carries two pins 148 which serve to trip the limit switches 150 and 151 (Figs. 3 and 14).

Removably coupled to the spindle 62 is a template or lens pattern 160 (Figs. 3 and 1). This template is adapted to engage a follower block or shoe 161 (Figs. 9, 10 and 11) that is mounted upon a carrier 162 which is pivoted by screws 163 to the downturned sides of a channel member 164. This channel member carries a pin 165 that threads adjustably into the channel member and that is locked in any adjusted position by a lock nut 166. The pin 165 engages and trips a limit switch 185.

The template 160 and limit switch 185 operate as in known machines. As the lens is ground down in one position the template 160 will move downwardly. When it reaches a point where the template bears upon the follower or shoe 161, the pin 165 will be forced downwardly to trip the limit switch 185. A solenoid valve 261 (Fig. 14) is then opened, as will be described further hereinafter, to supply hydraulic motive fluid to the hydraulic motor 120 to drive the work spindle 62 and rotate the work through a sufficient angle for the work, by its engagement with the grinding wheel, to lift the template away from shoe 161 again, thus permitting breaking of the circuit through the limit switch 185 and stopping the indexing movement of the work. The grinding wheel, therefore, resumes grinding of the work, but in the new area which has been indexed into grinding position.

Limit switch 185 is carried in a U-shaped bracket 169. This bracket is integral with a plunger 170. It carries a pin 172 which engages the periphery of a rotary cam 175. This cam is keyed to a shaft 176 which is journaled in a bracket 177 that is secured on column 22.

Figure 10:
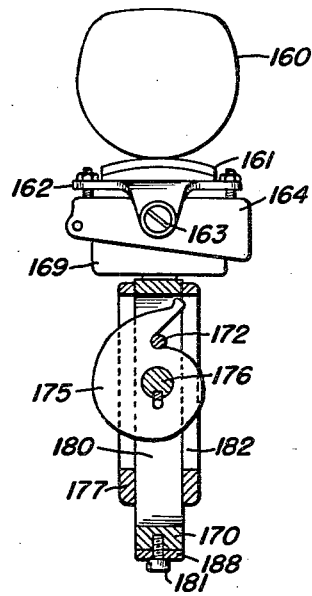
Fig. 10 is a section on the line 10—10 of Fig. 9 looking in the direction of the arrows.
Figure 11:
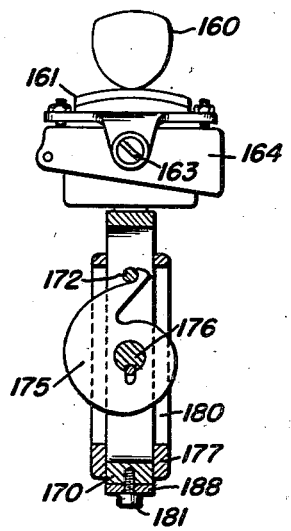
Fig. 11 is a similar section showing the control cam in a different position.

The shaft 176 is rotatably adjustable to position the cam in different angular positions, as shown in Figs. 10 and 11. The rotary adjustment of the shaft 176 and of the cam 175 are effected by manual rotation of a knob 178 which is secured to the shaft. The knob is graduated on its periphery to read against an index pointer 179.

The plunger 170 has a diametral slot 180 through it through which the cam 175 projects; and the bracket 177 is provided with an aligned slot 182 for this same purpose.

A coil spring 186, which fits into a recess in the bracket 177 and which engages against a plate 188 that is secured to the plunger 170 by the pin 181, serves to hold the pin 172 in engagement with the cam 175.

Adjustment of cam 175 permits of adjusting the position of shoe 161 relative to template 160, thereby permitting adjustment of the amount of stock to be removed from the work in a grinding operation.

Figure 7:
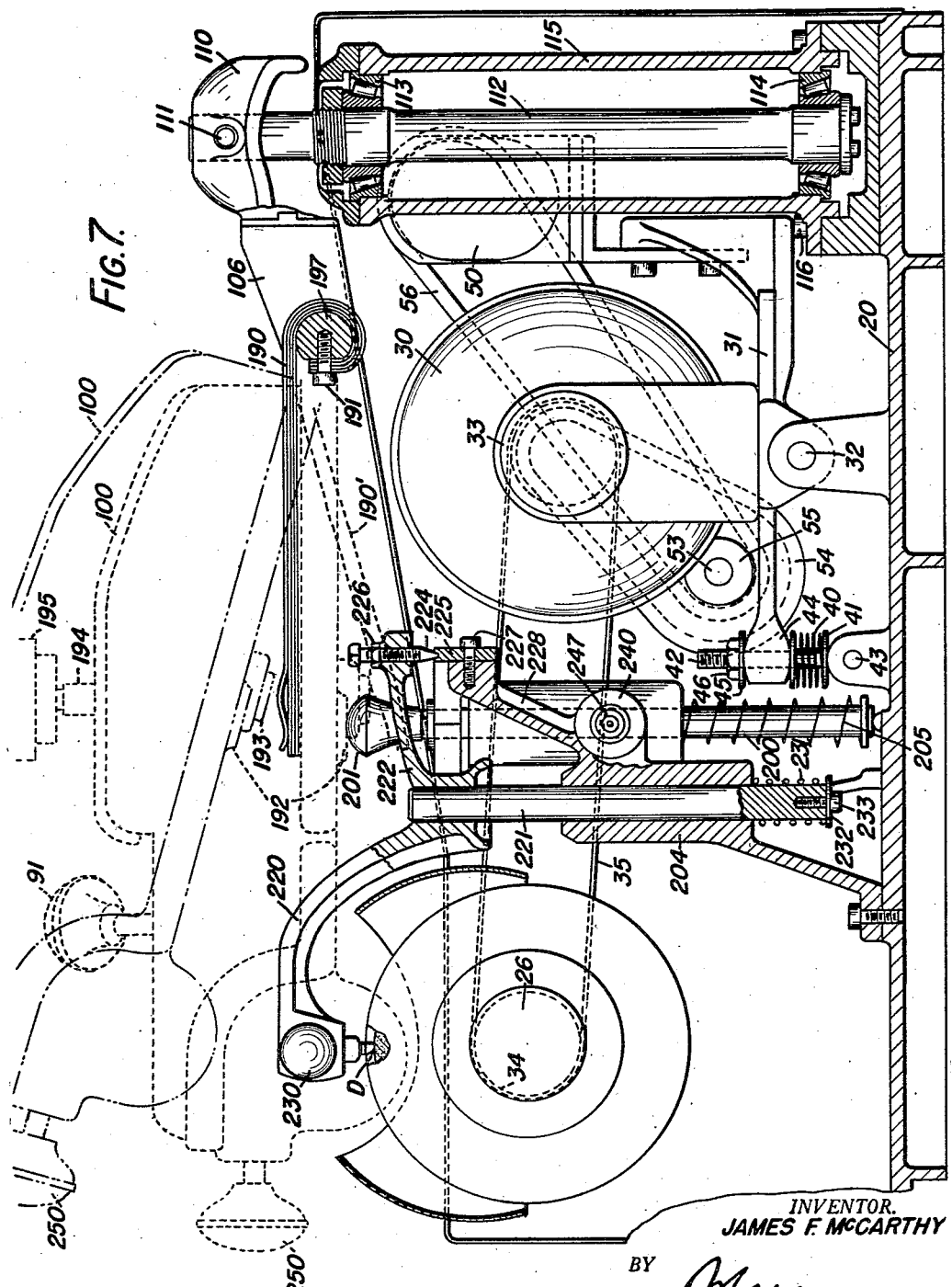
Fig. 7 is a vertical section on the scale of Fig. 6 showing the motor and grinding wheel mountings and the mounting for the dresser support.

The weight of the carriage 67 and of the support 100 (Fig. 3) maintains the lens blank in engagement with the grinding wheel. A leaf spring 190 (Fig. 7), however, cushions this engagement. This spring is secured by a screw 191 to a shaft 197 (Figs. 2 and 7). It bears against the base 193 of a stud 194 (Figs. 1 and 7) that is adjustably threaded into the carriage 67—100. This stud has a knob 195 (Fig. 1) fastened to it at its upper end by means of which it may be rotated to adjust the tension of the spring. In Fig. 7 the spring is shown in full lines in unflexed condition. It is so shown for clarity. In normal working position it is bent downwardly under the load of the work carriage as indicated in dotted lines at 190'.

Figure 12:
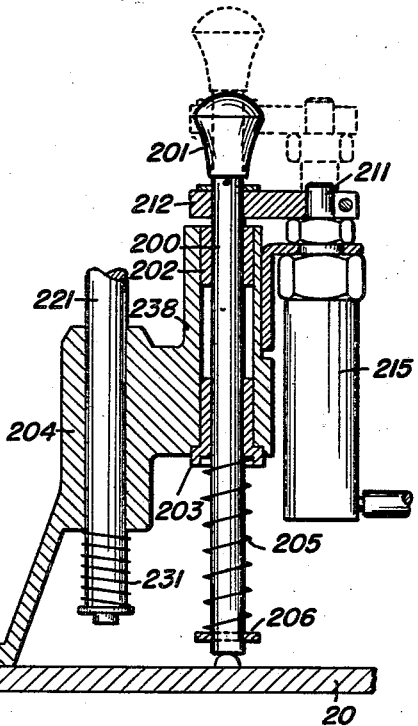
Fig. 12 is a section on the line 12—12 of Fig. 6 looking in the direction of the arrows.

At the end of the grinding operation, after the work has been ground around its whole periphery, as will be described further hereinafter, carriage 67—100 (Fig. 3) is moved away from the grinding wheel, to permit removal of the completed workpiece from the machine, and chucking of a new lens blank. The lifting movement is effected automatically by upward movement of a rod 200 (Figs. 7 and 12). This rod carries a rounded head member 201 which is adapted to engage a pad 192 on the underside of work-carriage 67—100.

Rod 200 is mounted to slide in bushings 202 and 203 in a bracket 204 that is fastened to the base of the machine. A coil spring 205, that surrounds the rod and that is interposed between the lower bushing 203 and a disc 206, serves to urge the rod constantly downwardly. The disc 206 is fixed to the rod 200. The rod is moved upwardly by operation of a piston 210 (Fig. 14) which reciprocates in a cylinder 215 (Figs. 12 and 14). The piston rod 211 of piston 210 is connected by a split clamp member 212 with the rod 200 so that they move together. In the diagrammatic showing of Fig. 14, the rod 200 is shown as though it were integral with piston rod 211.

Dressing of the wheel is effected by use of a diamond or other suitable truing tool D (Fig. 7) which is carried by one arm of a double-armed member 220 that is rotatably mounted upon a shaft 221 which is slidable axially in bracket 204 (Fig. 12). The other arm 222 (Fig. 7) of this member 220 carries a follower 224, in the form of a pin, which threads into the arm 222 and which is adapted to engage a template 225. The pin 224 is secured in any adjusted position by a lock nut 226. The template 225 is secured by a screw 227 to an extension 228 of bracket 204. The template 225 is shaped to conform to the shape which it is desired be dressed on the wheel. The diamond is adapted to be held in engagement with the wheel for dressing the wheel by grasping the spherical hand grips 230 (Figs. 6 and 7) that are secured to opposite ends of a bar 231 that is fastened in member 220. Fig. 6 shows the diamond swung to its inoperative position.

Figure 13:
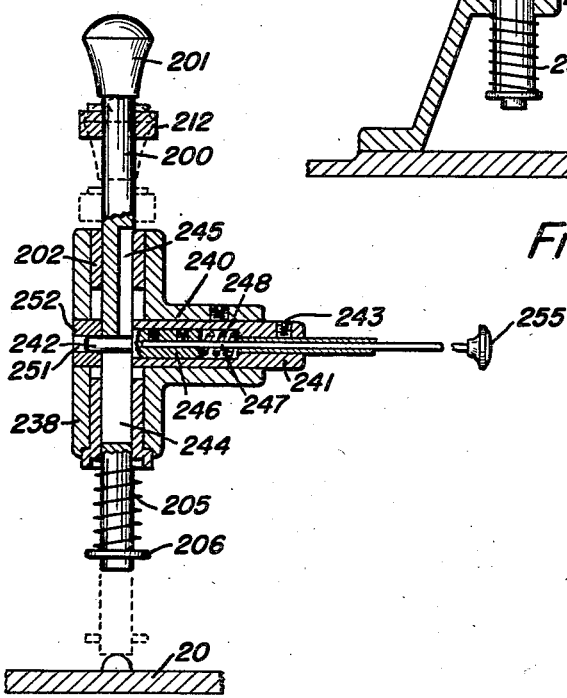
Fig. 13 is a section taken at right angles to the section of Fig. 12.

The rod 200 has an elongate groove 245 (Fig. 13) in it extending for a substantial part of its length. This groove connects with, and is a partial axial extension of, a slot 244 which extends diametrally through the rod for another portion of its length. Mounted to reciprocate in a sleeve 241, that is secured by a set-screw 243 in a boss 240 on a sleeve-like extension 238 of bracket 204 is a spring-pressed plunger 246. This plunger has a reduced diameter portion 242 at its left end (Fig. 13). It has a rod 247 secured to it by set screws. Rod 247 has a knob 255 secured to its right hand end by means of which it, and the plunger 246, may be moved to the right against the resistance of spring 248.

When the rod 200 is raised at the end of a grinding operation by action of the piston within cylinder 215, the plunger 246, which has been engaged in the groove 245 of the rod, rides down this groove 245 until the reduced diameter portion 242 of the plunger reaches diametral slot 244. Then spring 248 forces the plunger still further to the left as shown in Fig. 13, forcing the reduced diameter portion 242 of the rod through slot 244 into hole 251 in a bushing 252 which is press-fit into sleeve-like extension 238. This locks the work support 100 up in loading position clear of the grinding wheel, so that the completed lens can be removed from the machine and a new lens chucked in place.

If the rod 200 should be raised by the hydraulic motive fluid higher than the position shown in Fig. 13, it will simply drop back to the position shown in Fig. 13 where the shoulder formed by the upper end of the slot 244 rests on pin 242. Thus, the work support will be held clear of the wheel in loading position.

When a new lens blank has been placed in the machine, and it is desired to bring it into grinding position, the operator simply pulls on knob 255 to retract pin 242, and the work holder drops down by gravity, bringing the new lens blank into engagement with the grinding wheel.

Figure 9:
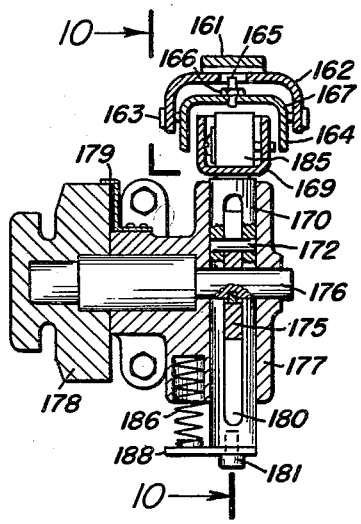
Fig. 9 is a detail section showing the mechanism for tripping the limit switch which controls the step-by-step rotary advance of the work.

The machine for bevel edge grinding may be wired electrically as shown diagrammatically in Fig. 14. $L_1$ and $L_2$ denote the main lines. Main line $L_1$ is connected by line 260 with the solenoid of a conventional two-way solenoid-operated valve 261. This solenoid is also connected by line 262 with the normally open limit switch 185 (Figs. 9 and 14). This switch is connected by line 263 with main line $L_2$. The two-way valve 261 is constantly spring-pressed in one direction. When the limit switch 185 is closed, however, the two-way valve 261 is shifted to its other position.

The solenoid of valve 261 is also connected through line 262 by a line 265 with the normally open limit switch 151 (Figs. 3 and 14) which in turn is connected by line 266 with main line $L_2$. A line 267 connects main line $L_2$ with normally open limit switch 150 (Figs. 3 and 14), which in turn is connected by line 269 with the solenoid of a conventional three-way solenoid operated valve 270. The solenoid of this valve is connected with main line $L_1$ by a line 271. Valve 270 is constantly spring-pressed in one direction and is shifted in the opposite direction when its solenoid is energized.

The hydraulic motive fluid is pumped by pump 50 (Figs. 6 and 14) out of the sump 275 (Fig. 14) in the base of the machine through the line 276. From the pump the hydraulic motive fluid passes through line 277 to a conventional relief and pressure reducing valve 280. The by-passed liquid returns from the relief valve 280 through lines 281 and 282 to the sump. The pressure fluid flows from the relief valve 280 through line 285 and the solenoid-operated valve 261 to the fluid motor 120 (Figs. 3 and 14) when the solenoid of valve 261 is energized. It is exhausted from the fluid motor 120 through lines 286, 289 and 282 to the sump. The pressure fluid flows to the solenoid-operated valve 270 from the pressure-reducing and relief valve 280 through line 287. It exhausts from valve 270 through lines 289 and 282 to the sump. Valve 270 is connected by line 288 to the lower end of the cylinder 215, in which the piston 210 reciprocates. When the three-way valve 270 is shifted the fluid exhausts from the bottom of the cylinder 215 through the line 288, the three-way valve 270, and lines 289 and 282 to the sump.

The operation of the bevel-edging machine is as follows:

The machine may be started by a conventional starter switch (not shown). The motor 30 (Fig. 6) then drives the grinding wheel W through the pulley and belt drive 33—35—34. The motor 30 also then drives pump 50 as shown in Fig. 6. Pump 50 pumps the hydraulic motive fluid to valves 261 and 270 as long as the motor is running. After a lens blank has been chucked in the machine, the work may be lowered into engagement with the wheel by pulling knob 255 (Fig. 13) to the right to permit spring 205 (Fig. 12) to lower rod 200. The lens, being oversize, at first holds the template 160 (Fig. 10) away from shoe 161. When the lens has been ground down in one position, however, to proper size, the template 160 will be lowered far enough to bear upon and trip the microswitch 185. A circuit is then closed to the solenoid of the two-way solenoid operated valve 261, this circuit being from the line L₁ through lines 260, the solenoid, line 262, the now closed limit switch 185, and line 263 to main line L₂. The closing of this circuit energizes the solenoid to shift the valve 261 to permit the pressure fluid to flow through line 285 to the fluid motor 120, driving this motor. The motive fluid exhausts from the motor 120 back to the sump through lines 286, 289 and 282. As the motor 120 rotates it drives wormwheel 138 (Figs. 3 and 4) through gearing 130, 131, 137, thereby effecting indexing rotation of the work. This advances the lens a step to a point where the lens lifts the template 160 away from the limit switch 185. Then the microswitch 185 opens again; the solenoid of valve 261 is deenergized; and the flow of the pressure fluid to the fluid motor 120 is stopped. This stops the work rotation instantly. The work remains stationary during grinding of the area of the lens newly-indexed into position, but when this is ground down to size, template 160 again trips limit switch 185; and the work is indexed through a slight angle, as before.

Each time that the work is advanced a step as described, the gearing 140, 141, drives the shaft 142 and advances the cam 145 a step. The gear reduction is such, however, that the cam 145 makes one revolution while the template 160 is making three revolutions. When the work is being indexed the last time, the cam 145 will complete a revolution. It will then trip the limit switches 150 and 151 (Figs. 3, 5 and 14). A circuit is thus made from the main line L₁ (Fig. 14) through the line 271, the solenoid of the three way valve 270, line 269, the now-closed limit switch 150, and line 267, to main line L₂. This will energize the solenoid of valve 270. This shifts the valve 270, causing flow of the hydraulic motive fluid from the line 287 through valve 270 and line 288 to the bottom of the cylinder 215 to raise rod 200 (Figs. 7, 12 and 14) and lift the completed lens out of engagement with the grinding wheel. The lens may then be removed from the machine and a new lens blank may be chucked in place.

The closing of the limit switch 151 by cam 145 insures that the work will be rotating when it leaves contact with the grinding wheel as the rod 200 lifts carriage 67 and support 100 (Fig. 3) upwardly away from the wheel; for when the limit switch 151 is closed a circuit is made from main line L₁, through line 260, the solenoid of two-way valve 261, lines 262 and 265, and line 266 to the main line L₂. This insures that valve 261 will continue open, even though template 160 leaves contact with shoe 161 as soon as the work starts to be raised clear of the wheel. This insures, therefore, that motor 120 will continue to run and drive the work as the work moves upwardly away from the wheel. With previous types of edge grinders, a hump was made on the lens at the completion of the grinding operation, because at the moment the work left the wheel, the template left the shoe also; and, therefore, the trip switch 185 opened, and there was no longer any means for rotating the carriage.

Because of the continued rotation of hydraulic motor 120, also, the cam 145 continues to rotate as the work is raised away from the wheel. When cam 145 rotates far enough, switches 150 and 151 open again and the hydraulic motor 120 stops causing stoppage of the work rotation. The spring 205 (Fig. 13) then drops the carriage lift piston 210 (Fig. 14), leaving the latch 242 (Fig. 13) engaged, however, holding the carriage in raised position. The overrunning clutch 134 allows the lens spindle to be rotated manually to proper position for mounting a new lens blank after the completed lens has been removed from the carriage.

While, when the machine is geared as described, the work makes three revolutions in a grinding operation, the second and third revolutions are relatively very fast because most of the stock is removed in the first indexing revolution of the work since the stopping of the work at the end of each index is instantaneous. In the present machine, therefore, the second and third revolutions of the work are merely clean up operations, and when the grinding operation is completed the lens will have been provided with a very smooth peripheral surface. In the second and third revolutions of the work, the work rotation is substantially continuous because the work will have been ground so close to size on its first revolution, and the work will hardly lift template 160 away from shoe 161 before the template engages the shoe again. This contrasts with operation of previous machines where due to coating of the work drive motor, there was always a great amount of stock left on the work, after the first indexing revolution of the work, to be removed in subsequent indexing revolutions of the work. The machine of the present invention, therefore, not only produces better work but is faster than prior machines.

Figure 15:
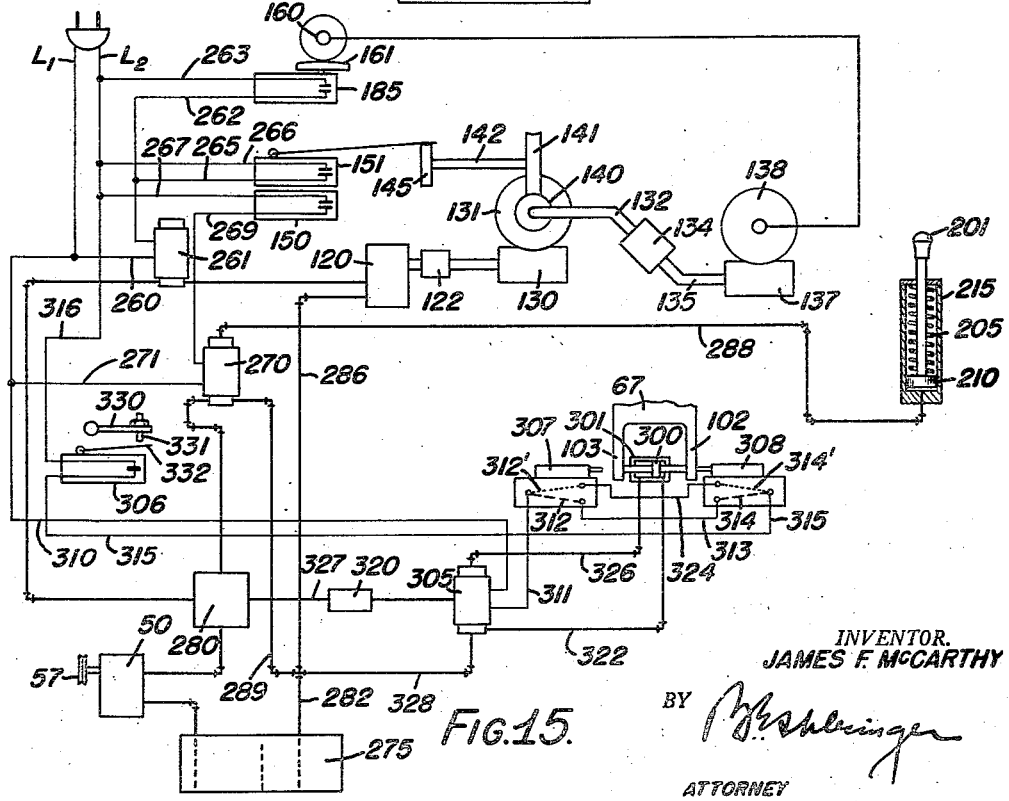
Fig. 15 is a hydraulic and electrical schematic layout of the machine when arranged for grinding a flat edge on a lens.

The manner in which a flat lens edging machine may be constructed according to the present invention is illustrated diagrammatically in Fig. 15. In this machine, a carriage oscillating piston is provided in addition to the parts described as used in the bevel edger.

The carriage oscillating piston is shown at 300 in Fig. 15. It reciprocates in a cylinder 301; and it projects at both ends beyond the ends of the cylinder, to engage the ears 102 and 103 of the work carriage 67—100 (Fig. 3).

The direction of flow of the motive fluid to cylinder 301 is controlled by a conventional solenoid-operated four-way valve 305. Operation of the four-way valve solenoid, in turn, is controlled by a normally-closed limit switch 306 and by two double-throw limit switches 307 and 308. Switches 307 and 308 are positioned to be tripped by ears 103 and 102, respectively, as the work carriage oscillates under actuation of piston 300.

Main line L₁ is connected with the solenoid of four-way valve 305 by line 310; and this solenoid is connected, in turn, by line 311 with switch 307. When the switch blade of the limit switch 307 is in the position shown at 312 in Fig. 15 and the switch blade of limit switch 308 is at position 314, a circuit will be made from main line L₁ through line 310, the solenoid of four-way valve 305, line 311, switch blade connection 312, line 313, switch blade connection 314, line 315, normally-closed limit switch 306 and line 316 to main line L₂. This will energize the solenoid of valve 305, causing the solenoid to shift valve 305. Duct 322, which connects with the right hand side of cylinder 301, will be put on supply; and duct 326, which connects with the left hand side of cylinder 301 will be put on exhaust. The pressure fluid will then flow from pump 50 through relief valve 280, duct 327, a conventional throttle valve 320, which controls the speed of movement of piston 300 and of oscillation of the work, four-way valve 305, and duct 322 into the right hand end of cylinder 301. The motive fluid will at the same time exhaust from the left hand end of cylinder 301 through duct 326, valve 305, and ducts 328 and 282 back to sump 275. The piston 300 will, therefore, move to the left from the position shown in Fig. 15.

The movement of piston 300 to the left will oscillate work carriage 67—100 clockwise about the axis of shaft 112 (Figs. 2 and 7) as viewed in Fig. 15, swinging the lens in one direction across the grinding wheel, which in this case will be a cylindrical wheel instead of a V-grooved wheel.

When the ear 102 of the work carriage moves away from limit switch 308, the switch blade of this switch will throw over to position 314'. When the ear 103 of the work carriage makes contact with limit switch 307 at the end of the leftward travel of piston 300, the switch blade of this switch will be shifted to position 312'. The circuit to the solenoid will then be from main line $L_1$ through line 310, the solenoid of four-way valve 305, line 311, switch blade connection 312', line 324, switch blade connection 314', line 315, limit switch 306, and line 316 to main line $L_2$.

This will shift valve 305 in the opposite direction, putting duct 326 on supply from duct 327 through throttle valve 320, and putting duct 322 on exhaust through duct 328. The piston will therefore move to the right, swinging the work carriage counterclockwise, as viewed in Fig. 15 about the axis of shaft 112, and moving the lens again across the periphery of the cylindrical grinding wheel.

When the ear 103 of the work carriage moves away from switch 307, the blade of this switch will throw over to position 312. When the work carriage reaches the end of its counterclockwise swinging movement, its ear 102 will again engage limit switch 308 and move its blade to position 314. The piston 300 will again be reversed, therefore.

So the operation will proceed, the work carriage being swing back and forth, swinging the work back and forth across the periphery of the wheel as it feeds into the wheel under pressure of the weight of the work carriage. As before in the case of the bevel edge grinder, when the lens has been ground down in a particular area to the desired size, the template 160 will trip switch 185 and the work will be indexed far enough for a new unground area of the work to lift the template 160 off shoe 161. Then the grinding of the work will be resumed with the wheel being fed down into the wheel by the weight of the work carriage, while the work is oscillated back and forth over the surface of the wheel to grind a flat peripheral area thereon. As in the case of the bevel edge grinder, when the grinding operation has been completed, cam 145 will trip limit switches 150 and 151 to cause piston 210 and rod 201 to raise the work carriage away from the wheel to loading position. When this occurs a trip member 330 (Fig. 15) which may be attached at any convenient point to the work carriage, and which carries an adjustable trip pin 331, will rock the trip arm 332 of limit switch 306, opening this switch and stopping the oscillating movement of the work carriage.

While the invention has been described in connection with two different embodiments thereof it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. An edge grinding machine for lenses comprising a pair of supports, a rotary tool holder rotatably mounted on one of said supports, a grinding wheel secured to said tool holder to rotate therewith, means for rotating said tool holder, a rotary work holder rotatably mounted on the other of said supports, means for securing a lens to said work holder coaxially thereof to rotate therewith, means for securing a lens template to said work holder coaxially thereof to rotate therewith, means for intermittently rotating said work holder step-by-step comprising a hydraulic motor, a valve for controlling supply of hydraulic motive fluid to said motor, said valve being normally closed to shut-off flow of the fluid to said motor to stop said motor and being operable to allow flow of the fluid to said motor to actuate the motor, one of said supports being movable in a direction at an angle to the axis of said work holder to permit relative feed and withdrawal movements between the lens and the grinding wheel, a member positioned to be engaged by said template to cause said valve to be opened to allow flow of the motive fluid to said motor to index the work holder a step, the lens being adapted to engage the grinding wheel to hold the template away from said member until the area of said lens which is in contact with said wheel has been ground down to a predetermined degree, means operative, after a predetermined number of revolutions of the work holder for moving one of said supports from operative position to effect relative withdrawal of the lens from operative relation with the wheel and means for simultaneously opening said valve, whereby at the time of said relative withdrawal from operative position the work will be rotated.

2. An edge grinding machine for lenses comprising a pair of supports, a rotary tool holder rotatably mounted on one of said supports, a grinding wheel secured to said tool holder to rotate therewith, means for rotating said tool holder, a rotary work holder rotatably mounted on the other of said supports, means for securing a lens to said work holder coaxially thereof to rotate therewith, means for securing a lens template to said work holder coaxially thereof to rotate therewith, means for intermittently rotating said work holder step-by-step comprising a hydraulic motor, a valve for controlling supply of hydraulic motive fluid to said motor, said valve being normally closed to shut off flow of the fluid to said motor to stop said motor and being operable to allow flow of the fluid to said motor to actuate the motor, one of said supports being movable in a direction at an angle to the axis of said work holder to permit relative feed and withdrawal between the lens and the grinding wheel, and a member positioned to be engaged and actuated by said template to cause said valve to be opened to allow flow of the motive fluid to said motor to index the work holder a step, the lens being adapted to engage the grinding wheel to hold the template away from said member until the area of said lens which is in contact with said wheel has been ground down to a predetermined degree, hydraulically operated means for moving said one support from operative position to effect disengagement of the lens from the wheel, and means driven step-by-step in time with the step-by-step rotation of the work holder for actuating the last-named means and for simultaneously effecting opening of said valve after rotation of the work holder through a predetermined angle, whereby when said one support is withdrawn from operative position said work holder will be rotated.

3. An edge grinding machine for lenses comprising a pair of supports, a rotary tool holder rotatably mounted on one of said supports, a grinding wheel secured to said tool holder to rotate therewith, means for rotating said tool holder, a rotary work holder rotatably mounted on the other of said supports, means for securing a lens to said work holder coaxially thereof to rotate therewith, means for securing a lens template to said work holder coaxially thereof to rotate therewith, means for intermittently rotating said work holder step-by-step comprising a hydraulic motor, a valve for controlling supply of hydraulic motive fluid to said motor, said valve being normally closed to shut off flow of the fluid to said motor to stop said motor and being operable to allow flow of the fluid to said motor to actuate the motor, one of said supports being movable in a direction at an angle to the axis of said work holder to permit relative feed and withdrawal between the lens and the grinding wheel, nd a member positioned to be engaged and actuated by said template to cause said valve to be opened to allow ow of the motive fluid to said motor to index the work older a step, the lens being adapted to engage the rinding wheel to hold the template away from said member until the area of said lens which is in contact with aid wheel has been ground down to a predetermined egree, hydraulically operated means for moving said ne support from operative position to effect disengagement of the lens from the wheel, a shiftable valve controlling flow of the hydraulic motive fluid to said hydraulically-operated means, and means driven in time with 1e step-by-step rotation of said lens holder for shifting 1e last-named valve upon completion of grinding of a ns to permit flow of the hydraulic motive fluid to said ydraulically-operated means to withdraw said one support from operative position, and means for simultaneously opening the first-named valve whereby the work will e rotating as said one support is withdrawn from operative position.

4. An edge grinding machine for lenses comprising a air of supports, a rotary tool holder rotatably mounted n one of said supports, a grinding wheel secured to said ool holder to rotate therewith, means for rotating said ool holder, a rotary work holder rotatably mounted on 1e other of said supports, means for securing a lens to aid work holder coaxially thereof to rotate therewith, 1eans for securing a lens template to said work holder oaxially thereof to rotate therewith, means for intermittently rotating said work holder step-by-step comprising a hydraulic motor, a valve for controlling supply of ydraulic motive fluid to said motor, said valve being ormally closed to shut-off flow of the fluid to said motor o stop said motor and being operable to allow flow of 1e fluid to said motor to actuate the motor, one of said 1pports being movable in a direction at an angle to 1e axis of said work holder to permit relative feed and ithdrawal between the lens and the grinding wheel, and member positioned to be engaged and actuated by said mplate to cause said valve to be opened to allow flow f the motive fluid to said motor to index the work older a step, the lens being adapted to engage the grinding wheel to hold the template away from said member ntil the area of said lens which is in contact with said heel has been ground down to a predetermined degree, ydraulically operated means for moving said one support :om operative position to effect disengagement of the ns from the wheel, and means driven step-by-step in me with the step-by-step rotation of the work holder or actuating the last-named means after rotation of the ork holder through a predetermined angle, and means perable upon actuation of said hydraulically-operated 1eans to open simultaneously the first-named valve to ermit flow of the motive fluid to said hydraulic motor, hereby said work holder will be rotated as said one upport is moved away from operative position.

5. An edge grinding machine for lenses comprising a air of supports, a rotary tool holder rotatably mounted n one of said supports, a grinding wheel secured to said ool holder to rotate therewith, means for rotating said ool holder, a rotary work holder rotatably mounted on he other of said supports, means for securing a lens to aid work holder coaxially thereof to rotate therewith, 1eans for securing a lens template to said work holder oaxially thereof to rotate therewith, means for intermittently rotating said work holder step-by-step comprising a hydraulic motor, and gearing operatively connecting aid work holder with said motor, a valve for controlling upply of hydraulic motive fluid to said motor, said valve eing normally closed to shut off flow of the fluid to said 1otor to stop said motor and being operable to allow flow of the fluid to said motor to actuate the motor, one of said supports being movable in a direction at an angle to the axis of said work holder to permit relative feed and withdrawal between the lens and the grinding wheel, a solenoid for shifting said valve, and a switch for controlling energization and deenergization of said solenoid, means for tripping said switch, said tripping means being positioned to be engaged and actuated by said template, said switch when tripped actuating said solenoid to open said valve to allow flow of the motive fluid to said motor to index the work holder a step, the lens being adapted to engage the grinding wheel to hold the template away from said tripping means until the area of said lens which is in contact with said wheel has been ground down to a predetermined degree, means for moving said one support from operative position to effect disengagement of the lens from the wheel and for simultaneously opening said valve, and gearing driven from said motor in time with the first-named gearing for controlling actuation of the last-named means.

6. An edge grinding machine for lenses comprising a pair of supports, a rotary tool holder rotatably mounted on one of said supports, a grinding wheel secured to said tool holder to rotate therewith, means for rotating said tool holder, a rotary work holder rotatably mounted on the other of said supports, means for securing a lens to said work holder coaxially thereof to rotate therewith, means for securing a lens template to said work holder coaxially thereof to rotate therewith, means for intermittently rotating said work holder step-by-step comprising a hydraulic motor, and gearing operatively connecting said work-holder with said motor, a valve for controlling supply of hydraulic motive fluid to said motor, said valve being normally closed to shut-off flow of the fluid to said motor to stop said motor and being operable to allow flow of the fluid to said motor to actuate the motor, one of said supports being movable in a direction at an angle to the axis of said work holder to permit relative feed and withdrawal between the lens and the grinding wheel, a solenoid for shifting said valve, and a switch for controlling energization and deenergization of said solenoid, means for tripping said switch, said tripping means being positioned to be engaged and actuated by said template, said switch when tripped actuating said solenoid to open said valve to allow flow of the motive fluid to said motor to index the work holder a step, the lens being adapted to engage the grinding wheel to hold the template away from said tripping means until the area of said lens which is in contact with said wheel has been ground down to a predetermined degree, hydraulically-operated means for moving said one support from operative position to effect disengagement of the lens from the wheel, a movable valve controlling flow of the hydraulic motive fluid to the last-named means, electrically-operated means for shifting the last-named valve, electrically-operated means for opening the first-named valve, a cam for actuating said electrically-operated means, and gearing driven from said motor in time with the first-named gearing for driving said cam.

References Cited in the file of this patent
UNITED STATES PATENTS

| Number | Name | Date |
|---|---|---|
| 1,687,252 | Laessker | Oct. 9, 1928 |
| 2,321,383 | Harper | June 8, 1943 |
| 2,406,606 | Jackson | Aug. 27, 1946 |
| 2,528,137 | Grasser | Oct. 31, 1950 |
| 2,617,236 | Allen et al. | Nov. 11, 1952 |
| 2,651,890 | Rubinstein | Sept. 15, 1953 |
| 2,670,575 | Reaser | Mar. 2, 1954 |
| 2,749,671 | Dillon | June 12, 1956 |